US012780057B2

(12) United States Patent
Walsh et al.

(10) Patent No.: US 12,780,057 B2
(45) Date of Patent: Nov. 3, 2026

(54) CHILD RESTRAINT SYSTEM WITH BELT TENSIONING MECHANISM

(71) Applicant: Britax Child Safety, Inc., Fort Mill, SC (US)

(72) Inventors: Quentin Walsh, Fort Mill, SC (US); Angela Stacey, Fort Mill, SC (US); Dan Ross, Vadnais Heights, MN (US); Nick Rydberg, Stillwater, MN (US)

(73) Assignee: Britax Child Safety, Inc., Fort Mill, SC (US)

( * ) Notice: Subject to any disclaimer, the term of this patent is extended or adjusted under 35 U.S.C. 154(b) by 98 days.

(21) Appl. No.: 18/927,481

(22) Filed: Oct. 25, 2024

(65) Prior Publication Data

US 2025/0135967 A1 May 1, 2025

Related U.S. Application Data

(60) Provisional application No. 63/593,777, filed on Oct. 27, 2023.

(51) Int. Cl.
*B60N 2/28* (2006.01)

(52) U.S. Cl.
CPC ......... *B60N 2/2821* (2013.01); *B60N 2/2806* (2013.01); *B60N 2/2869* (2013.01)

(58) Field of Classification Search
CPC ... B60N 2/2821; B60N 2/2806; B60N 2/2869
USPC .................................................... 297/256.16
See application file for complete search history.

(56) References Cited

U.S. PATENT DOCUMENTS

| | | | | | |
|---|---|---|---|---|---|
| 3,922,035 | A * | 11/1975 | Wener | B60N 2/2821<br>D6/333 |
| 7,988,230 | B2 * | 8/2011 | Heisey | B60N 2/2806<br>297/256.16 |
| 8,322,788 | B2 * | 12/2012 | Williams | B60N 2/2821<br>297/256.16 |
| 9,061,611 | B2 * | 6/2015 | Love | B60N 2/2884 |

* cited by examiner

*Primary Examiner* — Milton Nelson, Jr.
(74) *Attorney, Agent, or Firm* — K&L Gates LLP

(57) ABSTRACT

A child seat configured to be secured to a car seat is provided. The child seat includes a base and a tensioning mechanism. The base includes a belt path configured to receive a belt. The tensioning mechanism is pivotably attached to the base. The tensioning mechanism is adjustable between a first configuration and a second configuration. In the first configuration, the tensioning mechanism is disposed adjacent to a portion of the belt. In the second configuration, the tensioning mechanism applies tension to the portion of the belt.

9 Claims, 18 Drawing Sheets

CHILD RESTRAINT SYSTEM WITH BELT TENSIONING MECHANISM

PRIORITY CLAIM AND CROSS-REFERENCE TO RELATED APPLICATIONS

The present application claims priority to and benefit of U.S. Provisional Patent Application No. 63/593,777 filed Oct. 27, 2023, titled "CHILD RESTRAINT SYSTEM WITH BELT TENSIONING MECHANISM," the entire contents of which is are incorporated by reference herein in their entirety and relied upon.

BACKGROUND

Child restraint systems, also commonly called child safety seats, child seats, car seats, or booster seats, among others, are designed to protect children in vehicles from the effects of impacts or sudden changes in motion (e.g., sudden acceleration, sudden deceleration, and the like). Child restraint systems, referred to hereinafter as child seats, may be used in a variety of vehicles with different seat types and/or seating configurations. It is important for a child seat to be properly secured to the vehicle (e.g., car) seat to protect the occupant, but it is not uncommon for child seats to be installed or used improperly. For example, some child seats are secured to a car seat with a seat belt of the car; but in such situations, securing the child seat may be awkward and difficult to maintain a proper amount of tension. In such situations, an improper amount of belt tension is undesirable and may negatively affect the safety of the occupant within the child seat.

SUMMARY

The present disclosure relates to child restraint systems and, more particularly, to child restraint systems with belt tensioning systems.

Aspects of the subject matter described herein may be useful alone or in combination with one or more other aspects described herein. In light of the disclosure set forth herein, and without limiting the disclosure in any way, in a first aspect of the present disclosure, which may be combined with any other aspect, or portion thereof, a child seat includes a base and a tensioning mechanism. The base includes a belt path configured to receive a belt. The tensioning mechanism is pivotably attached to the base. The tensioning mechanism is adjustable between a first configuration and a second configuration. In the first configuration, the tensioning mechanism is disposed adjacent to a portion of the belt. In the second configuration, the tensioning mechanism applies tension to the portion of the belt.

In a second aspect of the present disclosure, which may be combined with any other aspect, or portion thereof, the tensioning mechanism includes a securement indicator.

In a third aspect of the present disclosure, which may be combined with any other aspect, or portion thereof, wherein the base includes a first portion contacting a bottom of the car seat and a second portion contacting a back of the car seat.

In a fourth aspect of the present disclosure, which may be combined with any other aspect, or portion thereof, the tensioning mechanism is pivotably attached to the first portion of the base.

In a fifth aspect of the present disclosure, which may be combined with any other aspect, or portion thereof, the tensioning mechanism is pivotably attached to the second portion of the base.

In a sixth aspect of the present disclosure, which may be combined with any other aspect, or portion thereof, when disposed in the second configuration, the tensioning mechanism is disposed in a receptacle of the second portion of the base.

In a seventh aspect of the present disclosure, which may be combined with any other aspect, or portion thereof, the tensioning mechanism includes a pivot assembly having an upper linkage and a lower linkage, wherein each of the upper linkage and lower linkage are affixed to both the tensioning mechanism and to the second portion of the base.

In an eighth aspect of the present disclosure, which may be combined with any other aspect, or portion thereof, the tensioning mechanism is configured to pivot and translate toward both the first portion of the base and the second portion of the base as the tensioning mechanism transitions from the first configuration to the second configuration.

In a ninth aspect of the present disclosure, which may be combined with any other aspect, or portion thereof, the tensioning mechanism includes a connector link, affixed to the tensioning mechanism, and further includes a ram, affixed to the connector link.

In a tenth aspect of the present disclosure, which may be combined with any other aspect, or portion thereof, the tensioning mechanism is configured to pivot toward the second portion of the base, and wherein, responsive to the pivoting, the ram translates in a downward direction toward the first portion of the base.

In an eleventh aspect of the present disclosure, which may be combined with any other aspect, or portion thereof, the second portion of the base further includes a tether system.

In a twelfth aspect of the present disclosure, which may be combined with any other aspect, or portion thereof, the tether system includes a separate tensioning mechanism, pivotably attached to the second portion of the base.

In a thirteenth aspect of the present disclosure, which may be combined with any other aspect, or portion thereof, the tensioning mechanism includes a securement indicator.

In a fourteenth aspect of the present disclosure, which may be combined with any other aspect, or portion thereof, a child seat includes a base and a tensioning mechanism. The base includes a belt path configured to receive a belt. The base includes a first portion contacting a bottom of the car seat and a second portion contacting a back of the car seat. The tensioning mechanism is coupled to the base. The tensioning mechanism is adjustable between a first configuration and a second configuration. In the first configuration, the tensioning mechanism is disposed adjacent to a portion of the belt. In the second configuration, the tensioning mechanism applies tension to the portion of the belt.

In a fifteenth aspect of the present disclosure, which may be combined with any other aspect, or portion thereof, the tensioning mechanism is pivotably attached to the second portion of the base.

In a sixteenth aspect of the present disclosure, which may be combined with any other aspect, or portion thereof, when disposed in the second configuration, the tensioning mechanism is disposed in a receptacle of the second portion of the base.

In a seventeenth aspect of the present disclosure, which may be combined with any other aspect, or portion thereof, the tensioning mechanism includes a pivot assembly having an upper linkage and a lower linkage, wherein each of the upper linkage and lower linkage are affixed to both the tensioning mechanism and to the second portion of the base.

In an eighteenth aspect of the present disclosure, which may be combined with any other aspect, or portion thereof, the tensioning mechanism is configured to pivot and translate toward both the first portion of the base and the second portion of the base as the tensioning mechanism transitions from the first configuration to the second configuration.

In a nineteenth aspect of the present disclosure, which may be combined with any other aspect, or portion thereof, the tensioning mechanism includes a connector link, affixed to the tensioning mechanism, and further includes a ram, affixed to the connector link.

In a twentieth aspect of the present disclosure, which may be combined with any other aspect, or portion thereof, the tensioning mechanism is configured to pivot toward the second portion of the base, and wherein, responsive to the pivoting, the ram translates in a downward direction toward the first portion of the base.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE FIGURES

The specification makes reference to the following appended figures, in which use of like reference numerals in different figures is intended to illustrate like or analogous components.

DETAILED DESCRIPTION

Figure 1:
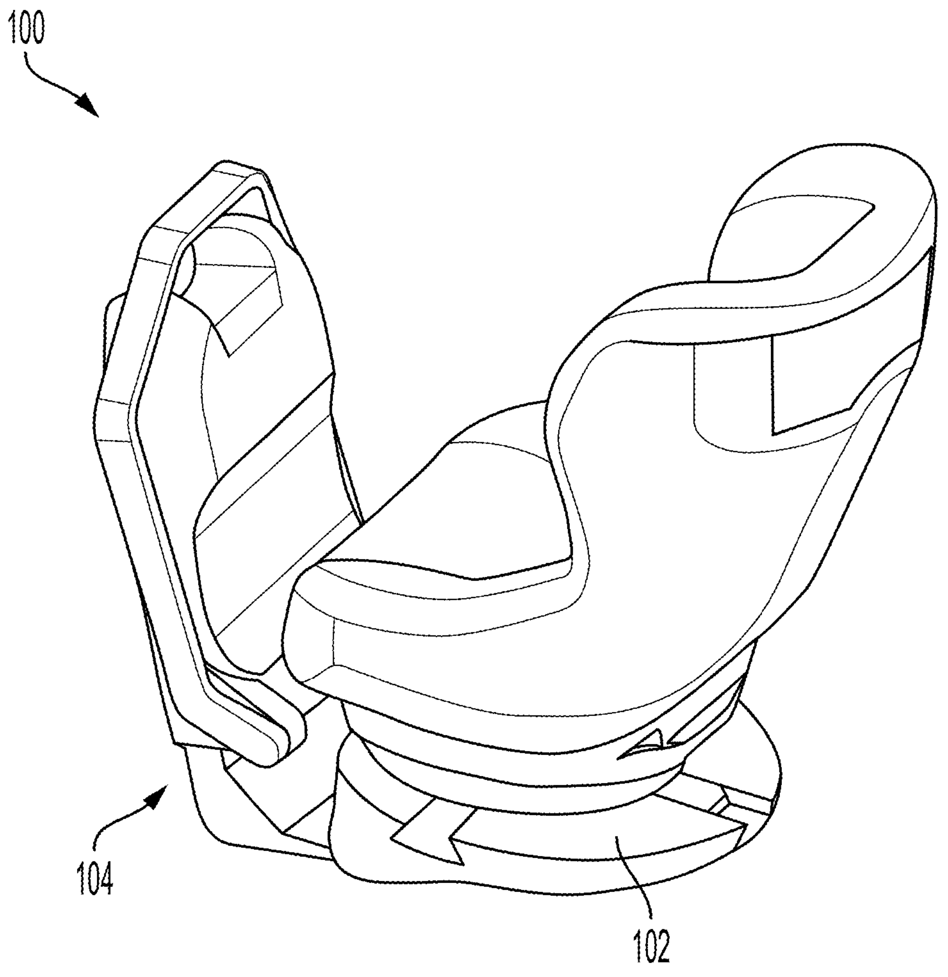
FIG. 1 illustrates an example of a perspective view of a child seat, according to various embodiments.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12." In the figures and the description, like numerals are intended to represent like elements.

A child seat may be configured for installation based on the height and weight of a child and according to various guidelines and standards, such as those of the United States National Highway Transportation Safety Administration. To ensure maximum protection for an occupant of the child seat, the child seat must be secured to a fixed location in a vehicle, such as using a seat belt of the car seat or Lower Anchors and Tethers for Children ("LATCH") attachments. When seat belts are used to secure the child seat, the seat belt is often positioned around the child seat and then engaged with a buckle attached to the car seat. However, slack in the seat belt may often occur, even when the seat belt is tightly fastened, and such slack causes the child seat to be loosely secured to the vehicle, which presents an unsafe condition for the occupant of the child seat. Moreover, a user is often required to install the child seat in a vehicle with limited space, making it difficult to maneuver the child seat and properly position a seat belt around the child seat. With additional space, the chances of proper installment may increase, providing safer conditions for the occupant of the child seat during transport.

Described herein are locking mechanisms for child seats that provide easy securing of the child seat using a seat belt. In certain aspects, the locking mechanism described herein may allow a user to easily apply tension to a buckled seat belt during installation of the child seat, and may optionally allow for a one-handed operation of the locking mechanism by the user. The locking mechanism may secure the child seat to the car seat in a fully secured or tensioned configuration, which may provide increased safety for an occupant of the child seat. The locking mechanism may be configured to provide the user with a mechanical advantage, to ensure significant tensioning with minimal required effort. Additionally, the locking mechanism described herein in certain aspects may automatically adjust the child seat, providing additional space for the user to properly install the child seat. Various other advantages and benefits may be realized with the locking mechanism described herein, and the aforementioned benefits and advantages should not be considered limiting.

Figure 2:
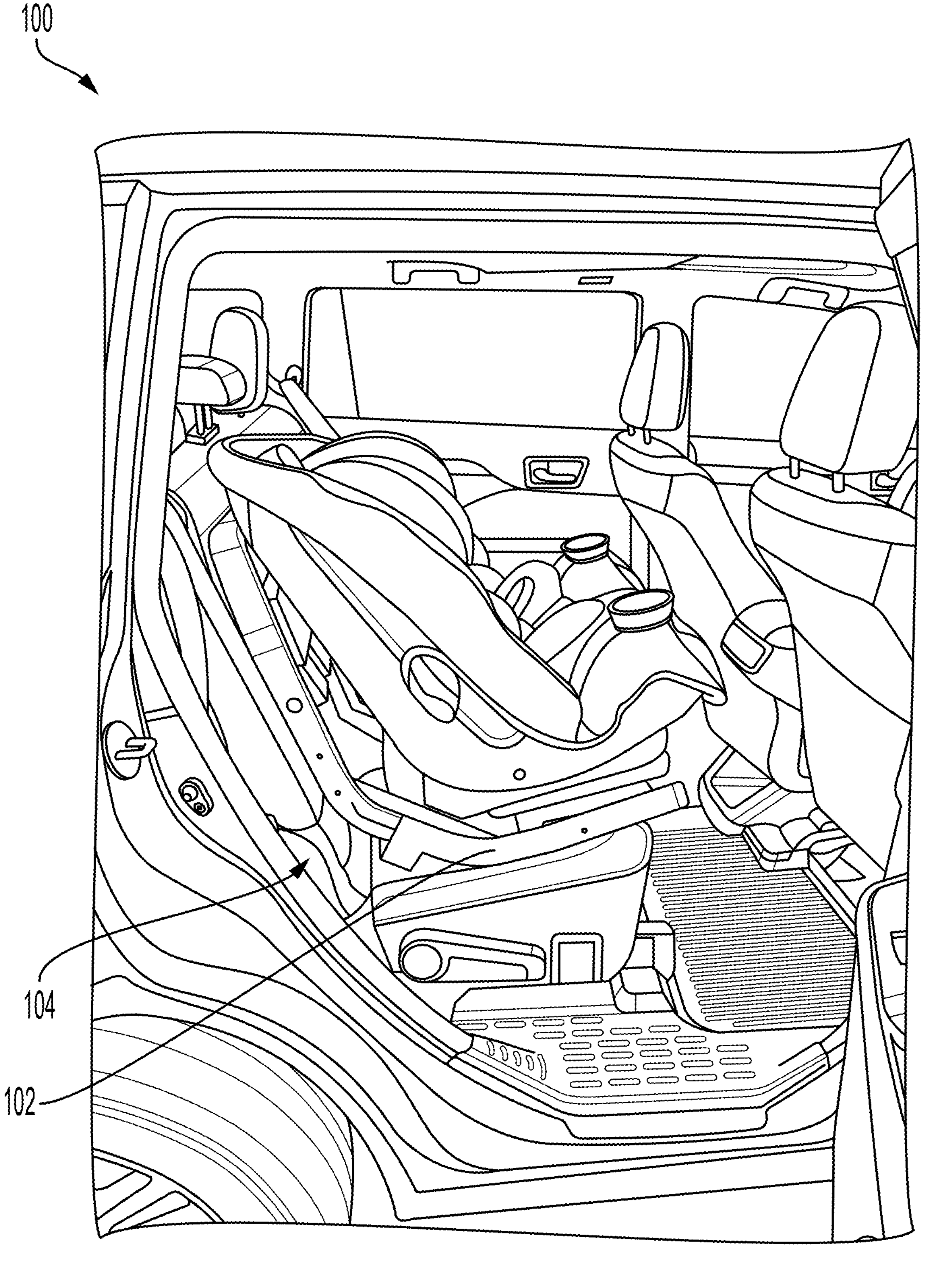
FIG. 2 illustrates an example of a child seat in a front facing configuration, according to various embodiments.
Figure 3:
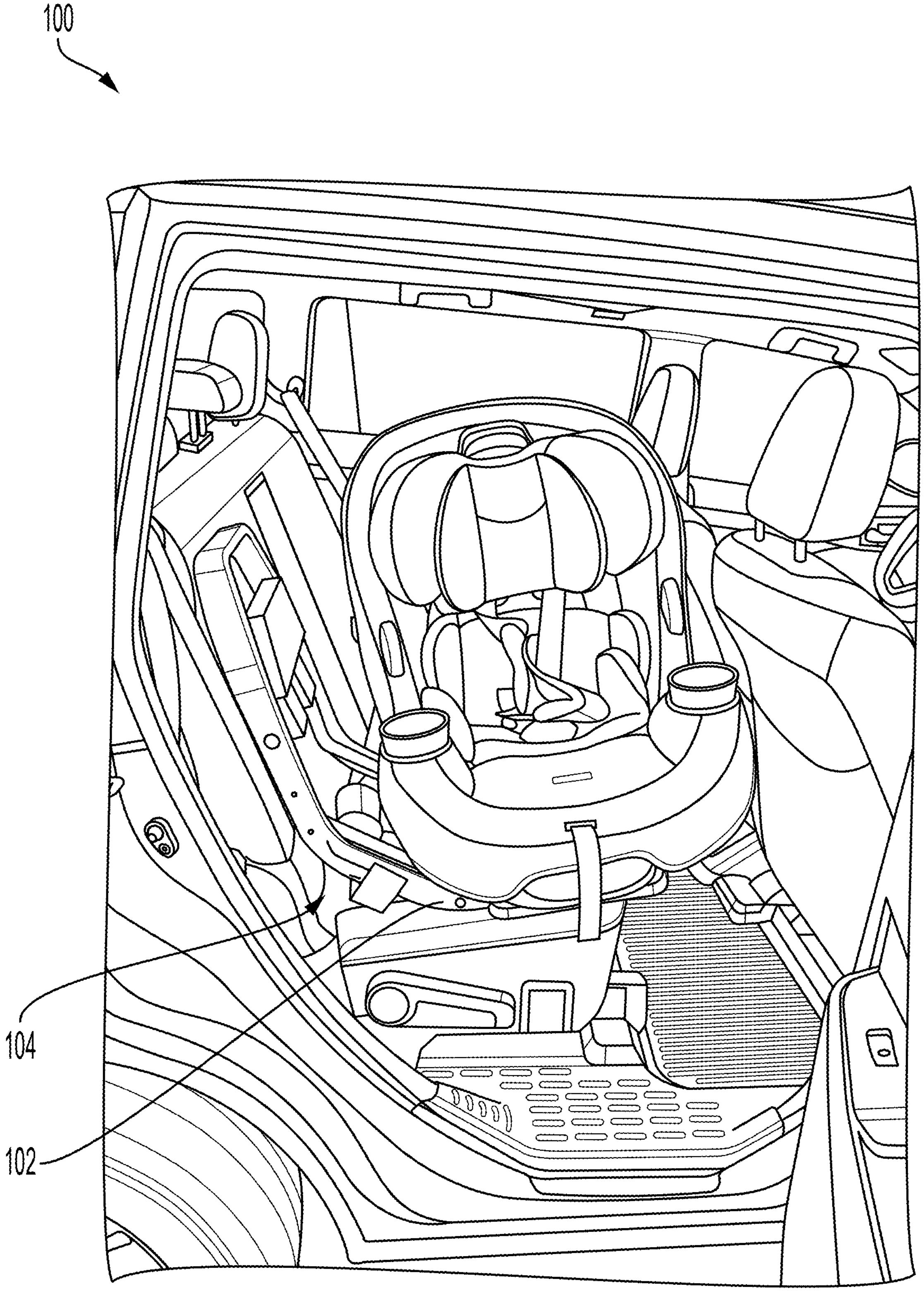
FIG. 3 illustrates an example of a child seat in a side facing configuration, according to various embodiments.

FIG. 1 illustrates an example of a perspective view of a child seat 100, according to various embodiments. The child seat 100 includes a base 102 and a tensioning mechanism 104. In the embodiment illustrated, the child seat 100 is an infant car seat in a rear facing configuration. However, the child seat 100 may be configured to swivel about the base 102. Thus, a user may, for example, rotate the child seat 100 into a front facing configuration. FIG. 2 illustrates an example of a child seat in a front facing configuration, according to various embodiments. A user may further rotate the child seat 100 into side facing or side-loading configuration, as illustrated in FIG. 3. The side-loading configuration provides ease of access for a user to load an occupant into (or out of) the child seat 100. Once the occupant is secured to the child seat 100, the user then may rotate the child seat 100 to the front facing configuration or the rear facing configuration. In other embodiments, the child seat 100 may be fixed to the base 102, and the base 102 may be provided with other types of child seats, including convertible cart seats and a three-in-one car seat. The base 102 may be further configured to remain secured in the vehicle while, for example, the infant car seat is detachable. Thus, in an illustrative example, a user may only have to secure the base 102 to the vehicle seat once. Then, the user may attached or detach the infant car seat to the base 102 as desired. While the tensioning mechanism 104 is located on the base 102 of the child seat 100 in FIG. 1, the tensioning mechanism 104 may be provided at other locations in various embodiments depending on the type of child seat as disclosed in greater detail herein.

Figure 4:
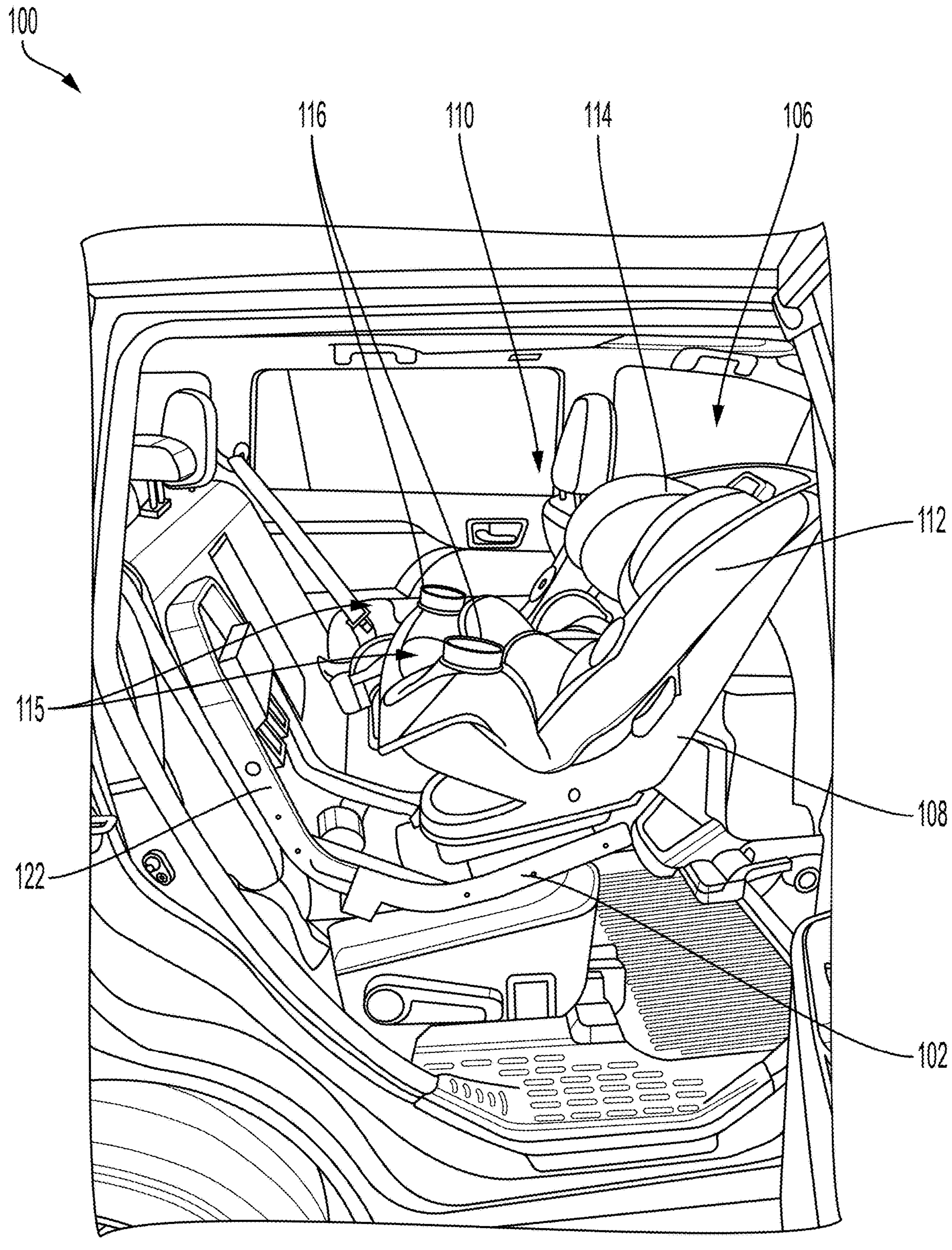
FIG. 4 illustrates an example of a child seat in a rear facing configuration, according to various embodiments.

FIG. 4 illustrates an example of a child seat installed in a vehicle in a rear facing configuration, according to various embodiments. As illustrated in FIG. 4, the child seat 100 includes a carrier 106, which may be releasably attached to the base 102. The carrier 106 may include a shell 108. The carrier 106 generally defines an occupant area 110 for receiving an occupant, such as a child. The carrier 106 may include various features, such a shell cover 112 to provide padding for the occupant, an adjustable headrest 114 to allow a user to adjust the position of the headrest to the occupant, or cup holders 116. As illustrated in FIG. 4, the shell cover 112 compliments the various features of the shell 108. For example, the shell cover 112 includes apertures 115 configured to allow the respective cup holders 116, as part of the shell 108, to extend therethrough. The particular carrier 106 illustrated in FIG. 4 should not be considered limiting, and in various embodiments, other types of carriers may be releasably or fixedly attached to the base 102, including carriers that have additional or different features as compared to those illustrated in FIG. 4.

Figure 5:
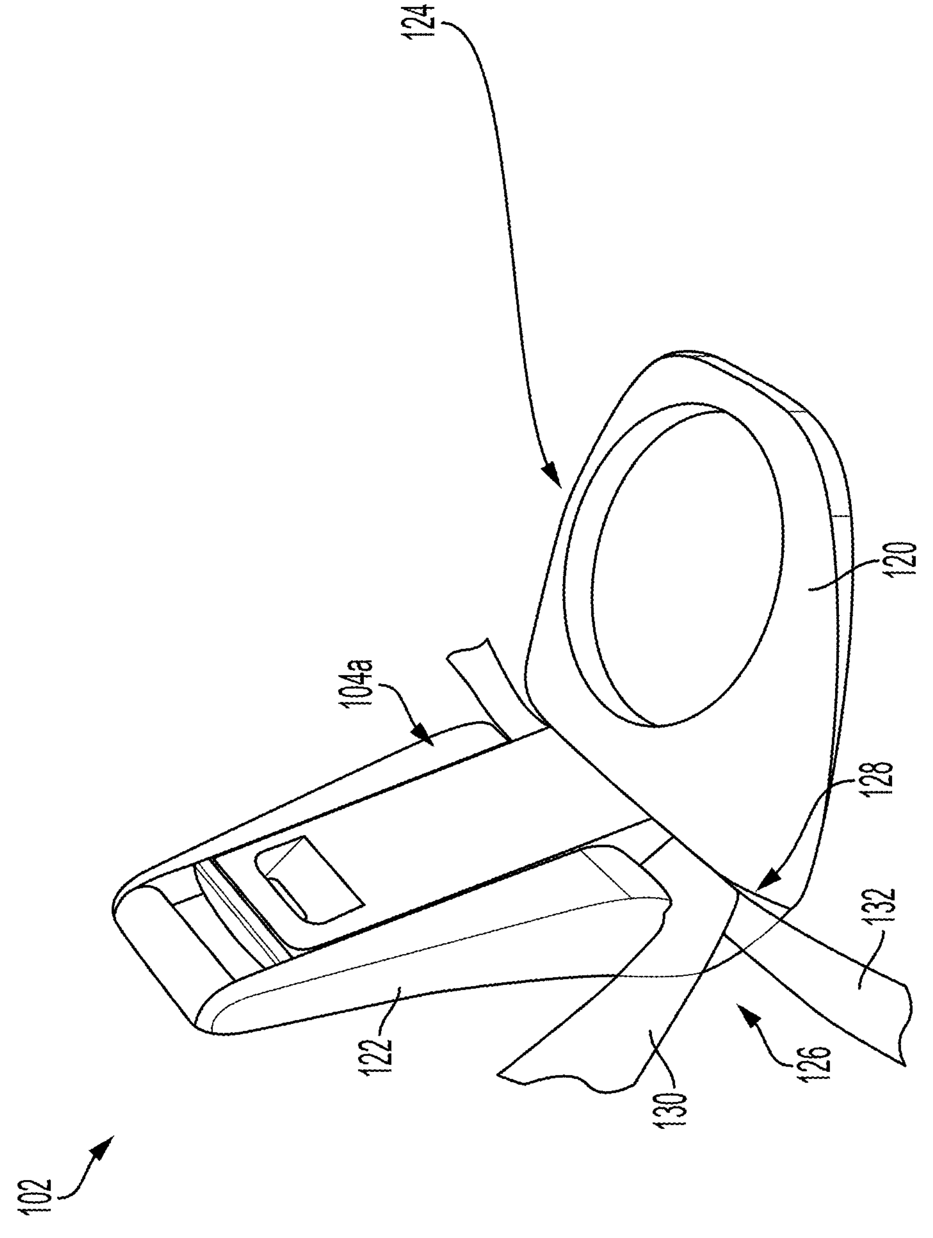
FIG. 5 illustrates a perspective view of a base of a child seat having a tensioning mechanism, according to various embodiments.

FIG. 5 illustrates a perspective view of a base of a child seat having a tensioning mechanism, according to various embodiments. The base 102 of the child seat includes a base wall 120 and a back wall 122. The base wall 120 defines a receiving area 124 configured to receive the carrier of the child seat. As introduced above, the child seat may be coupled to the base 102 in any number of ways. For example, the child seat may be rotatably coupled to the base 102 via the base wall 120, such that a user may adjust the child seat to any one of a number of rotational and/or angular configurations. In another example, the child seat may be fixedly coupled to the base 102 in a predetermined configuration.

Generally, a vehicle seat includes a seat portion and a back portion. The seat portion includes a seat, providing an area for a passenger to sit while supporting the passenger's legs. The back portion includes a seat back to support the passenger's upper body. When properly installed in a vehicle, the base wall 120 engages the seat portion of the vehicle seat and the back wall 122 engages the back portion of the vehicle seat. In the rear facing configuration, as shown in FIG. 4, the child seat faces the back wall 122 of the base 102. Similarly, in the front facing configuration, as shown in FIG. 2, the child seat faces away from the back wall 122 of the base 102.

The base wall 120 and/or the back wall 122 are further configured to at least partially receive a seat belt 126 of a car seat. As illustrated in FIG. 5, the base 102 receives the seat belt 126 of a car seat via a belt path 128. In various embodiments, the belt path 128 guides and positions a shoulder belt 130 and a lap belt 132 of the seat belt 126 relative to the base 102. In the embodiment illustrated, the belt path 128 is provided at an interface between the base wall 120 and back wall 122 and defines a guide region that is recessed relative to the base wall 120 and back wall 122. In FIG. 5, the belt path 128 provides a smooth interface into and through the guide region, which reduces stress on the seat belt 126. It should be appreciated that belt path 128 may include physical slots or guides for receiving seat belt 126. It should also be appreciated that in alternative embodiments, belt path 128 is configured to guide and position only a shoulder belt 130 or, alternatively, only a lap belt 132. Belt path 128 may be positioned on base wall 120 or back wall 122.

As previously introduced, the base 102 of child seat includes a tensioning mechanism 104. The tensioning mechanism 104 may include a variety of different features as discussed in greater detail herein. In a number of non-limiting examples, tensioning mechanism **104*a* is a first embodiment depicted in FIG. 5; tensioning mechanism 104*b* is a second embodiment depicted in FIG. 7; and tensioning mechanism 104*c* is a third embodiment depicted in FIG. 9**. It should be appreciated that any feature of any embodiment may be combined or substituted with respect to any other features described, as appreciated by one of skill in the art.

Figure 6:
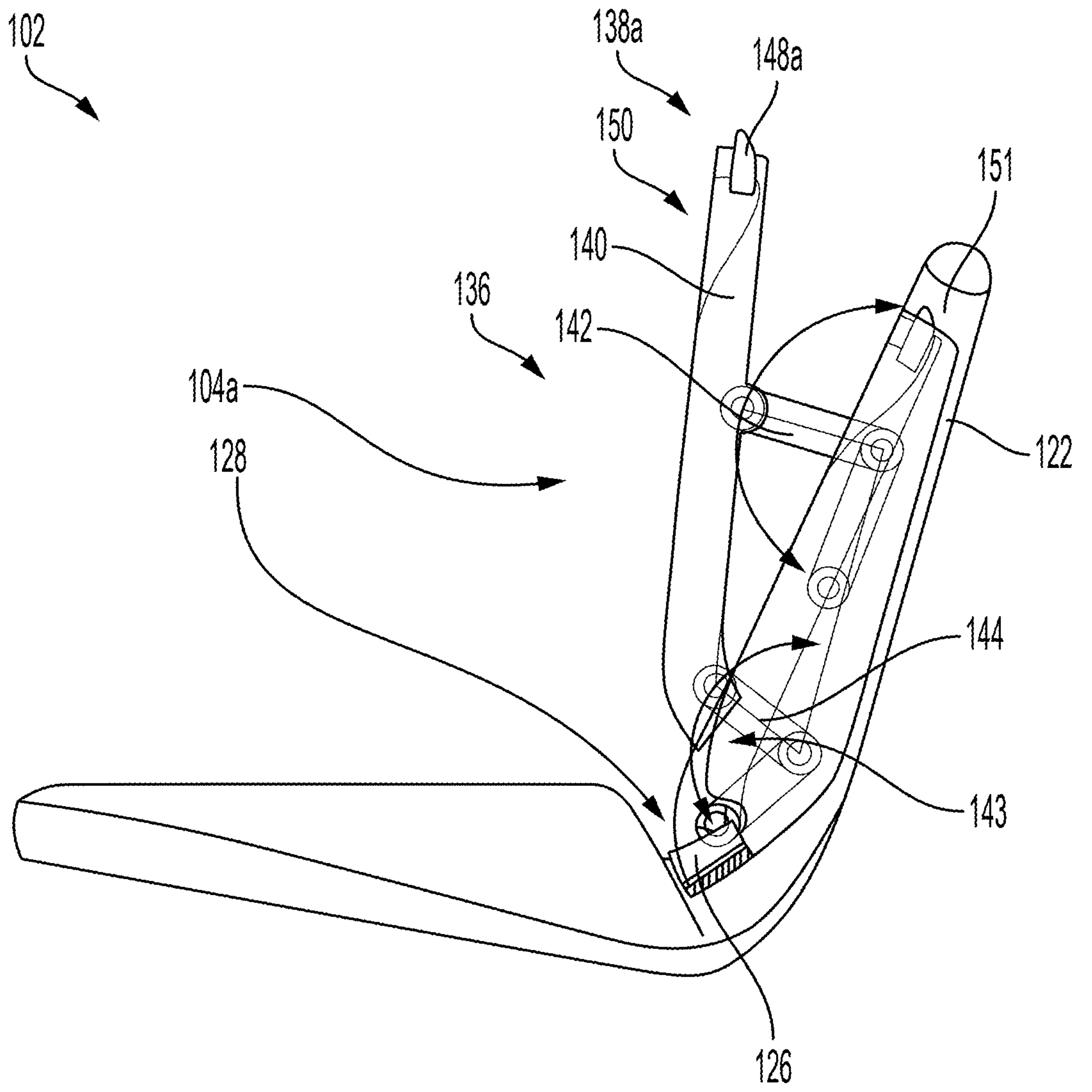
FIG. 6 illustrates a side cross sectional view of a base of a child seat having a tensioning mechanism, according to various embodiments.

The tensioning mechanism **104*a* is configured to secure the base 102, and thereby the child seat, to the seat of a vehicle. The tensioning mechanism 104*a* is pivotably connected to the back wall 122 and includes an open configuration and a closed configuration. The tensioning mechanism 104*a* is activated in the closed configuration and is deactivated in the open configuration. In FIG. 5, the tensioning mechanism 104*a* is activated in the closed configuration. In FIG. 6, the tensioning mechanism 104*a* is deactivated in the open configuration. When a user adjusts the tensioning mechanism 104*a* from the open configuration to the closed configuration, the tensioning mechanism 104*a* mechanically engages with, and subsequently tightens, the seat belt 126 within the belt path 128, removing slack of the seat belt 126 and securing the child seat to the vehicle seat. Similarly, when a user adjusts the tensioning mechanism 104***a* from the closed to the open configuration, the tensioning mechanism 104*a* releases the seat belt 126, creating slack and loosening the child seat from the vehicle seat.

FIG. 6 illustrates a side cross sectional view of a base of a child seat having a tensioning mechanism, according to various embodiments. Referring to FIG. 6, the tensioning mechanism 104*a* is in the open configuration. The tensioning mechanism 104*a* includes a pivot assembly 136 configured to engage the seat belt 126 within the belt path 128. The pivot assembly 136 includes a back wall pivot 140 connected to an upper link 142 and a lower link 144. Upper link 142 and lower link 144 are pivotably coupled to the back wall pivot 140; upper link 142 and lower link 144 are pivotably coupled to back wall 122 (e.g., via one or more pivot points). In an illustrative example, the tensioning mechanism 104*a* is in the open configuration. As a user adjusts the tensioning mechanism 104*a* from the open configuration to the closed configuration, the back wall pivot 140 pivots via the upper link 142 and lower link 144 to engage a recess of the back wall 122. As the back wall pivot 140 engages the recess of the back wall 122, a contact portion 143 of the back wall pivot 140 provides a force onto the seat belt 126 within the belt path 128. Thus, the tensioning mechanism 104*a* tightens the seat belt 126, removing slack of the seat belt 126 by applying the force, and consequently securing the base 102 to the vehicle seat. Tensioning mechanism 104*a* is of sufficient length (from contact point 143 up towards a top handle of tensioning mechanism 104*a*) such that the pivoting of tensioning mechanism 104*a* to the closed configuration provides substantial mechanical advantage; as the user manually adjusts tensioning mechanism 104*a* to the closed configuration (e.g., by pushing along a top side of tensioning mechanism 104*a*) substantial mechanical force is generated at contact portion 143.

In contrast, as a user adjusts the tensioning mechanism 104*a* from the closed configuration to the open configuration, the back wall pivot 140 pivots via the upper link 142 and the lower link 144, retracting the back wall pivot 140 from the recess of the back wall 122. As the back wall pivot 140 retracts from the recess of the back wall 122, the contact portion 143 of the back wall pivot 140 extends away from the seat belt 126 within the belt path 128, thereby releasing the force from the seat belt 126, creating slack and loosening the child seat from the vehicle seat.

The tensioning mechanism 104*a* may further include a locking assembly 138*a* having a locked configuration and an unlocked configuration. When in the locked configuration, a user is unable to adjust the tensioning mechanism 104*a* between the open and closed configurations. Alternatively, when the locking assembly 138*a* is in the unlocked configuration, a user is able to adjust the tensioning mechanism 104*a* between the open and closed configurations. In an embodiment, the locking assembly 138*a* includes a release 148*a* located within a recess 150 of the tensioning mechanism 104*a*. The release 148*a* engages a notch 151 in the back wall 122. In the locked configuration, the release 148*a* extends into the notch 151, thereby preventing a user from adjusting the tensioning mechanism 104*a*. When a user actuates the release 148*a*, to disengage the recess 150, the locking assembly 138*a* is unlocked and the user is able to adjust the tensioning mechanism 104*a* between the open and closed configurations.

Figure 7:
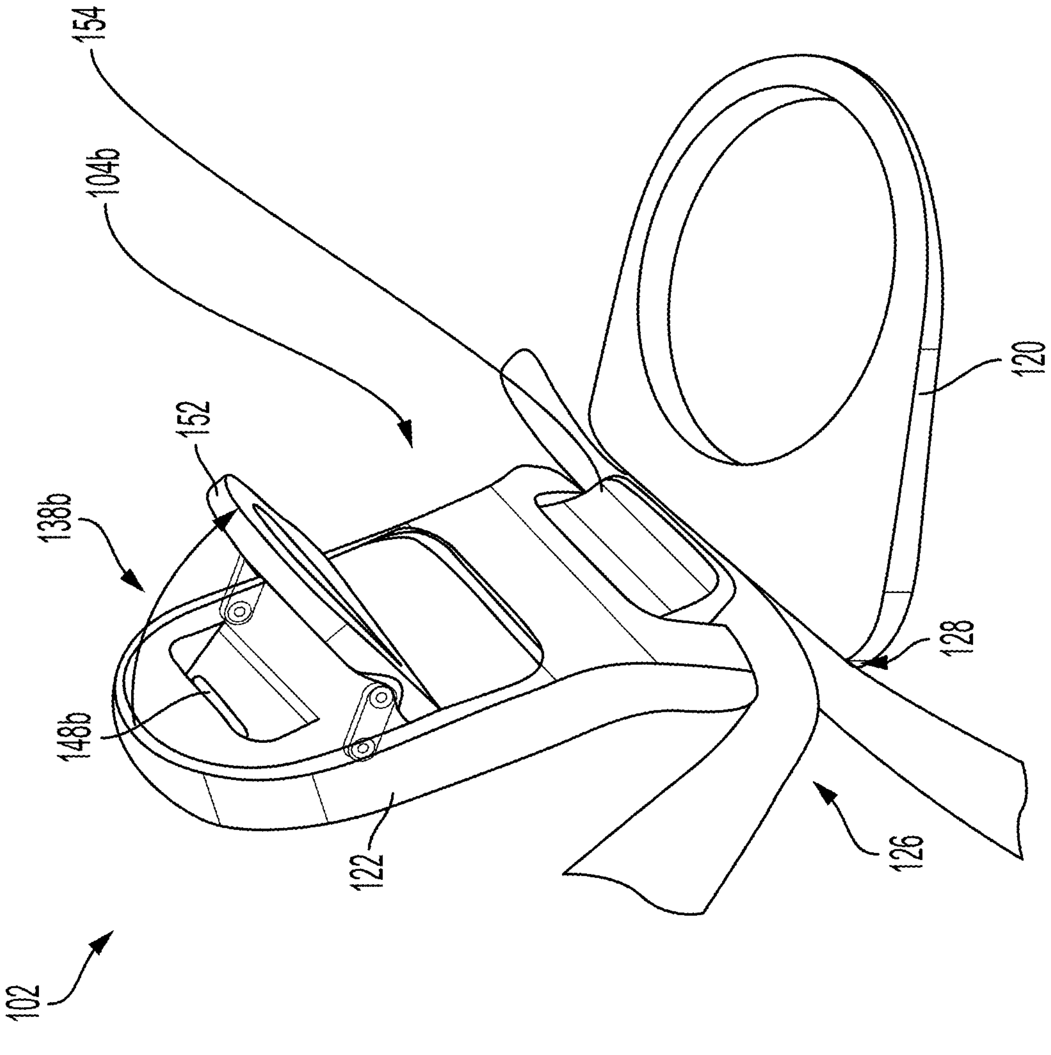
FIG. 7 illustrates a perspective view of a base of a child seat having a tensioning mechanism, according to various embodiments.
Figure 8:
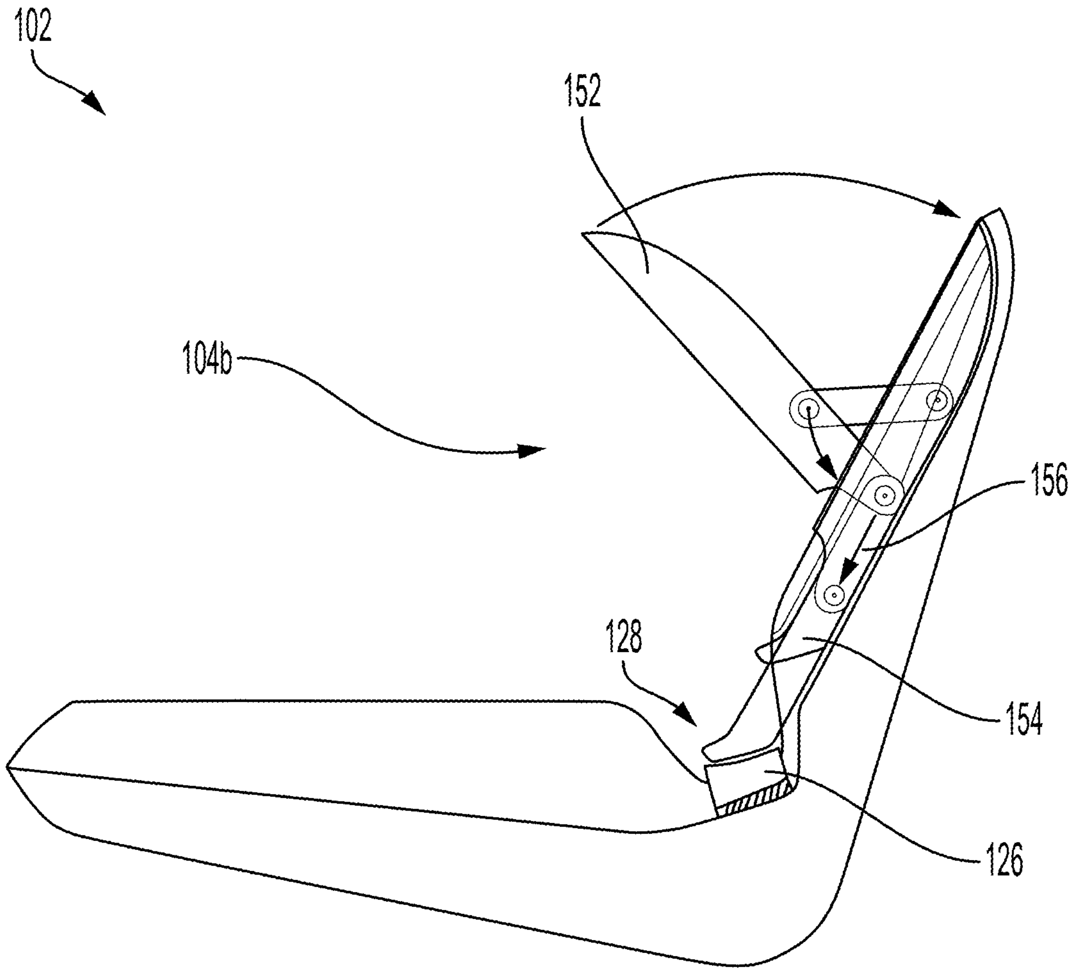
FIG. 8 illustrates a side cross sectional view of a base of a child seat having a tensioning mechanism, according to various embodiments.

FIGS. 7 to 8 illustrate a perspective view and a side cross sectional view of a base of a child seat having a tensioning mechanism 104*b*, according to various embodiments. The base 102 includes a back wall 122 and a base wall 120. The base 102 receives a seat belt 126 of a car seat via a belt path 128. In the embodiment illustrated, the belt path 128 is provided at an interface between the base wall 120 and back wall 122 and defines a guide region that is recessed relative to the base wall 120 and back wall 122. The base 102 may include a tensioning mechanism 104*b*.

The tensioning mechanism 104*b* includes a lever 152 operatively connected to a ram 154 via a connector link 156. The tensioning mechanism 104*b* is deactivated when the lever 152 is in an opened position, as shown in FIG. 7. As a user adjusts the lever 152 from the open position to a closed position, the connector link 156 extends the ram 154, which provides a force onto the seat belt 126 within the belt path 128. Thus, the tensioning mechanism 104*b* tightens the seat belt 126, removing slack and securing the base 102 to the vehicle seat. Tensioning mechanism 104*b*, similar to tensioning mechanism 104*a*, is of sufficient length (from connector link 156 up towards a top handle of tensioning mechanism 104*b*) such that the pivoting of tensioning mechanism 104*b* to the closed configuration provides substantial mechanical advantage; as the user manually adjusts tensioning mechanism 104*b* to the closed configuration (e.g., by pushing along a top side of tensioning mechanism 104*b*) substantial mechanical force is generated downward by the ram 154.

In contrast, as a user adjusts the lever 152 from the closed position to the opened position, the connector link 156 retracts the ram 154 from the seat belt 126. As the connector link 156 retracts the ram 154 from the seat belt 126, the force on the seat belt 126 is released, creating slack and loosening the child seat from the vehicle seat.

The tensioning mechanism 104*b* may further include a locking assembly 138*b* having a locked configuration and an unlocked configuration. In the locked configuration, a user is unable to adjust the tensioning mechanism 104*b* between the open configuration and the closed configuration. Alternatively, a user is able to adjust the tensioning mechanism 104*b* between the open configuration and the closed configuration when the locking assembly 138*b* is in the unlocked configuration. In an embodiment, the locking assembly 138*b* includes a release 148*b* located on the back wall 122 of the base 102. In an example embodiment, the release 148*b* engages the lever 152, thereby maintaining the lever 152 in the closed position. However, when a user actuates the release 148*a* to disengage the lever 152, the locking assembly 138*b* is in the unlocked position and the user is capable of adjusting the lever 152 to the open position.

Figure 9:
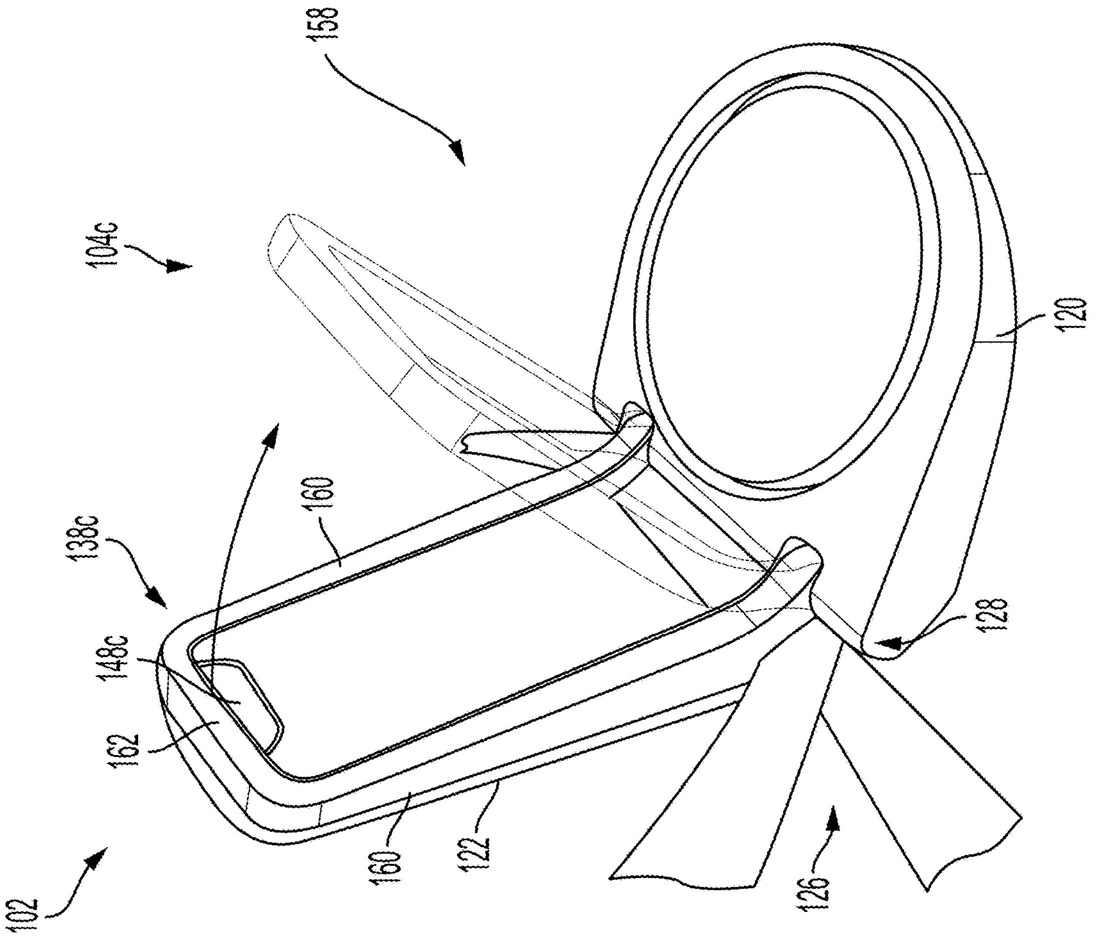
FIG. 9 illustrates a perspective view of a base of a child seat having a tensioning mechanism, according to various embodiments.
Figure 10:
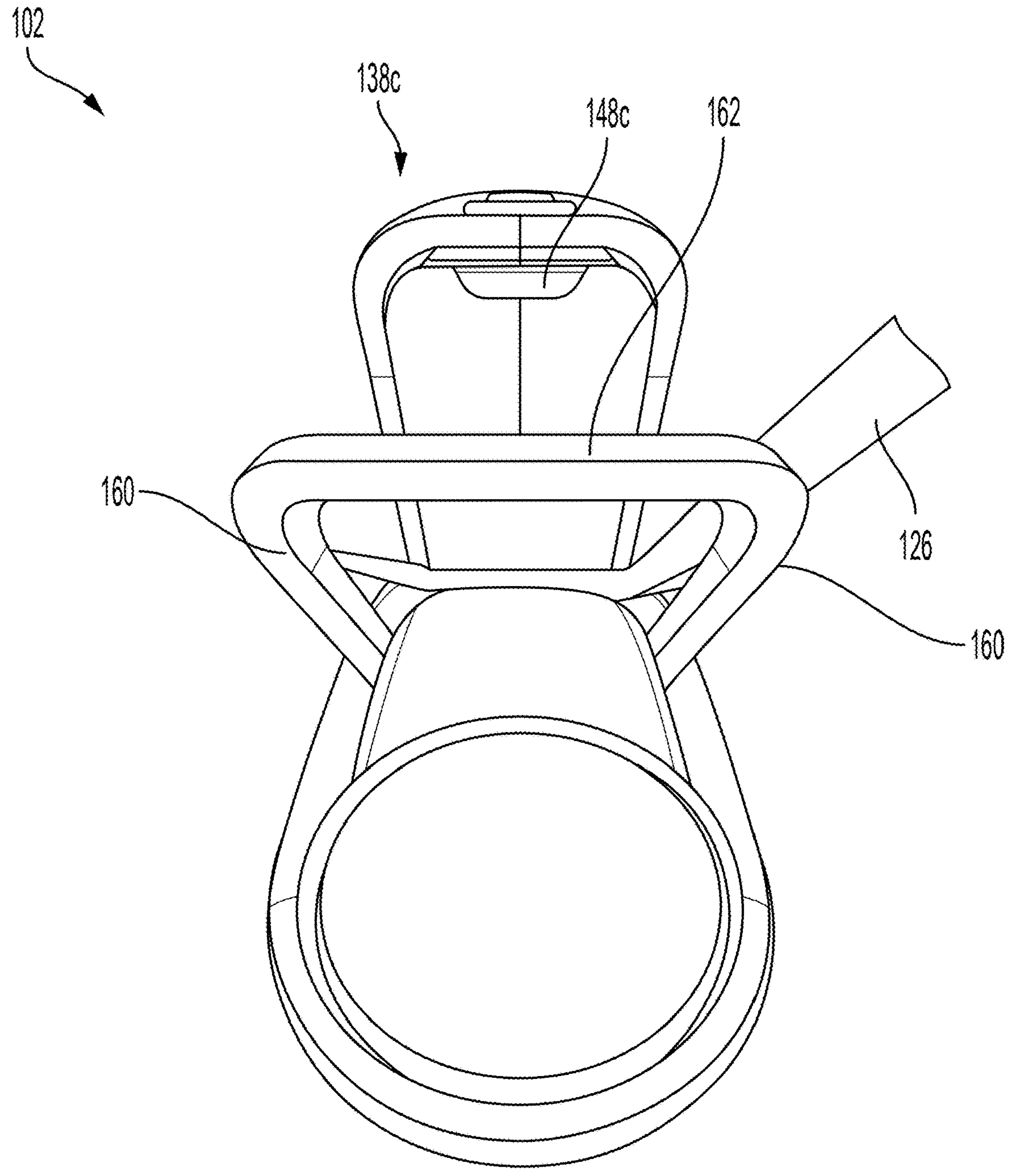
FIG. 10 illustrates a front view of a base of a child seat having a tensioning mechanism, according to various embodiments.

FIGS. 9 to 10 illustrate a perspective view and a front view of a base of a child seat having a tensioning mechanism 104*c*, according to various embodiments. The base 102 includes a back wall 122 and a base wall 120. The base 102 receives a seat belt 126 of a car seat via a belt path 128. In the embodiment illustrated, the belt path 128 is provided at an interface between the base wall 120 and back wall 122 and defines a guide region that is recessed relative to the base wall 120 and back wall 122. The base 102 may include a tensioning mechanism 104*c*.

The tensioning mechanism 104*c* includes a lever system 158 pivotably connected to the base wall 120. The lever system 158 includes side arms 160 and a top bar 162. In an illustrative example, the tensioning mechanism 104*c* is deactivated when the lever system 158 is in an opened position as shown in FIG. 10. As a user pivotably rotates the lever system 158 to a closed position, the lever system 158 engages the seat belt 126 within the belt path 128 and provides a force onto the seat belt 126. Thus, the tensioning mechanism 104*c* tightens the seat belt 126, removing slack and securing the base 102 to the vehicle seat. In contrast, as a user adjusts the lever system 158 from the closed position to the opened position, the lever system 158 disengages the seat belt 126 within the belt path 128, releasing the force from the seat belt 126 and providing slack. Tensioning mechanism 104*c*, and particularly side arms 160, is of sufficient length (from its pivot point up towards top bar 162) such that the pivoting of tensioning mechanism 104*c* to the closed configuration provides substantial mechanical advantage; as the user manually adjusts tensioning mechanism 104*c* to the closed configuration (e.g., by pushing along top bar 162 of tensioning mechanism 104*c*) substantial mechanical force is generated at the pivot point.

Figure 11:
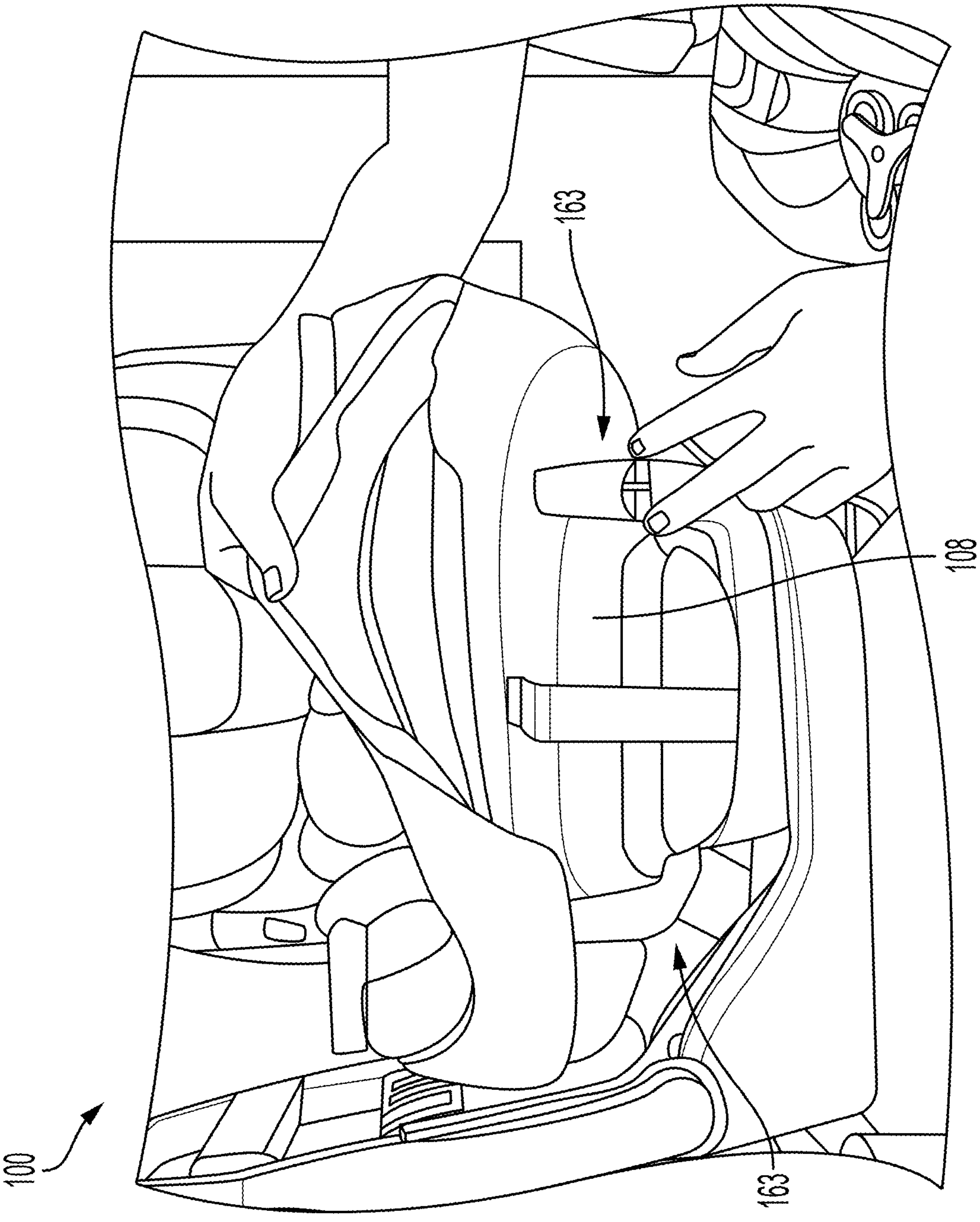
FIG. 11 illustrates an example of a child seat in a side facing configuration, according to various embodiments.

As shown in FIG. 11, in certain embodiments, the shell 108 of the child seat 100 includes slots 163 that receive the side arms 160 of the lever system 158 when tensioning mechanism 104*c* is in the open configuration. Namely, by receiving the side arms 160, the lever system 158 may rotate further away from the back wall 122 of the base 102 in the open configuration. This allows for an overall increase in rotation from the open configuration to the closed configuration. Increase in total rotation of lever system 158 results in a greater amount of leverage onto the seat belt 126. In short, the increased leverage will provide a greater amount of force onto the seat belt, removing additional slack from the seat belt 126 and providing a more secure connection between the child seat 100 and the vehicle seat; slots 163 in shell 108 provide this capability for increased leverage.

Referring back to FIG. 10, the tensioning mechanism 104*c* may further include a locking assembly 138*c* having a locked configuration and an unlocked configuration. In the locked configuration, a user is unable to adjust the tensioning mechanism 104*c* between the open and closed configurations. Alternatively, when the locking assembly 138*c* is in the unlocked configuration, a user is able to adjust the tensioning mechanism 104*c* between the open and closed configurations. In an embodiment, the locking assembly 138*c* includes a release 148*c* located on the back wall 122 of the base 102. The release 148*c* is configured to engage the lever system 158, thereby maintaining the lever system 158 in the close position. However, when a user actuates the release 148*c* to disengage the lever system 158, the tensioning mechanism 104*c* is in the unlocked position and a user is capable of adjusting the lever system 158 to the open position.

While the tensioning mechanism 104*a-c* are configured to secure the child seat 100 to a vehicle seat, in various embodiments, additional tensioning mechanisms may provide added security for child seat 100.

Figure 12:
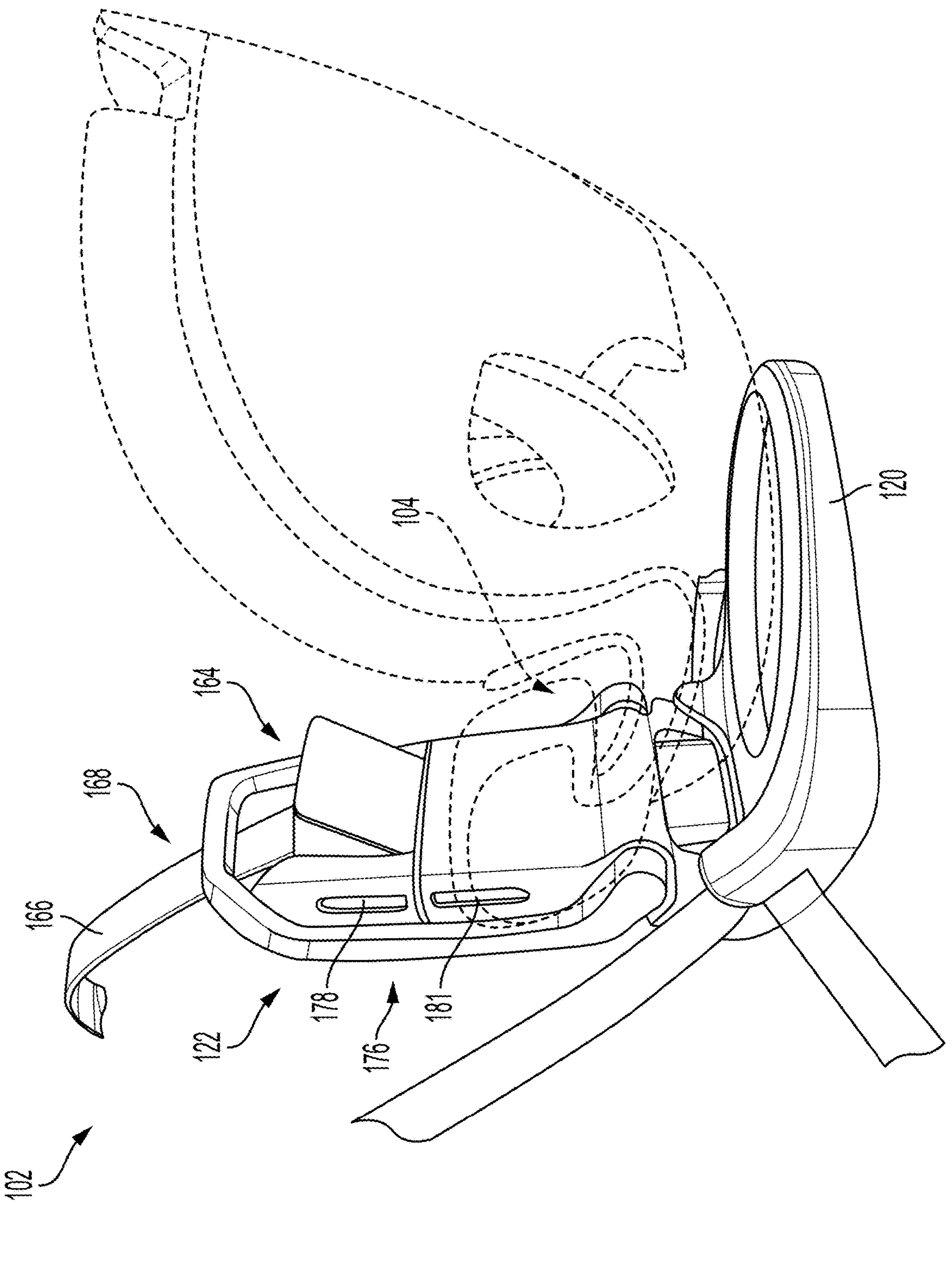
FIG. 12 illustrates a perspective view of a child seat having a tensioning mechanism and a tether system, according to various embodiments.
Figure 13:
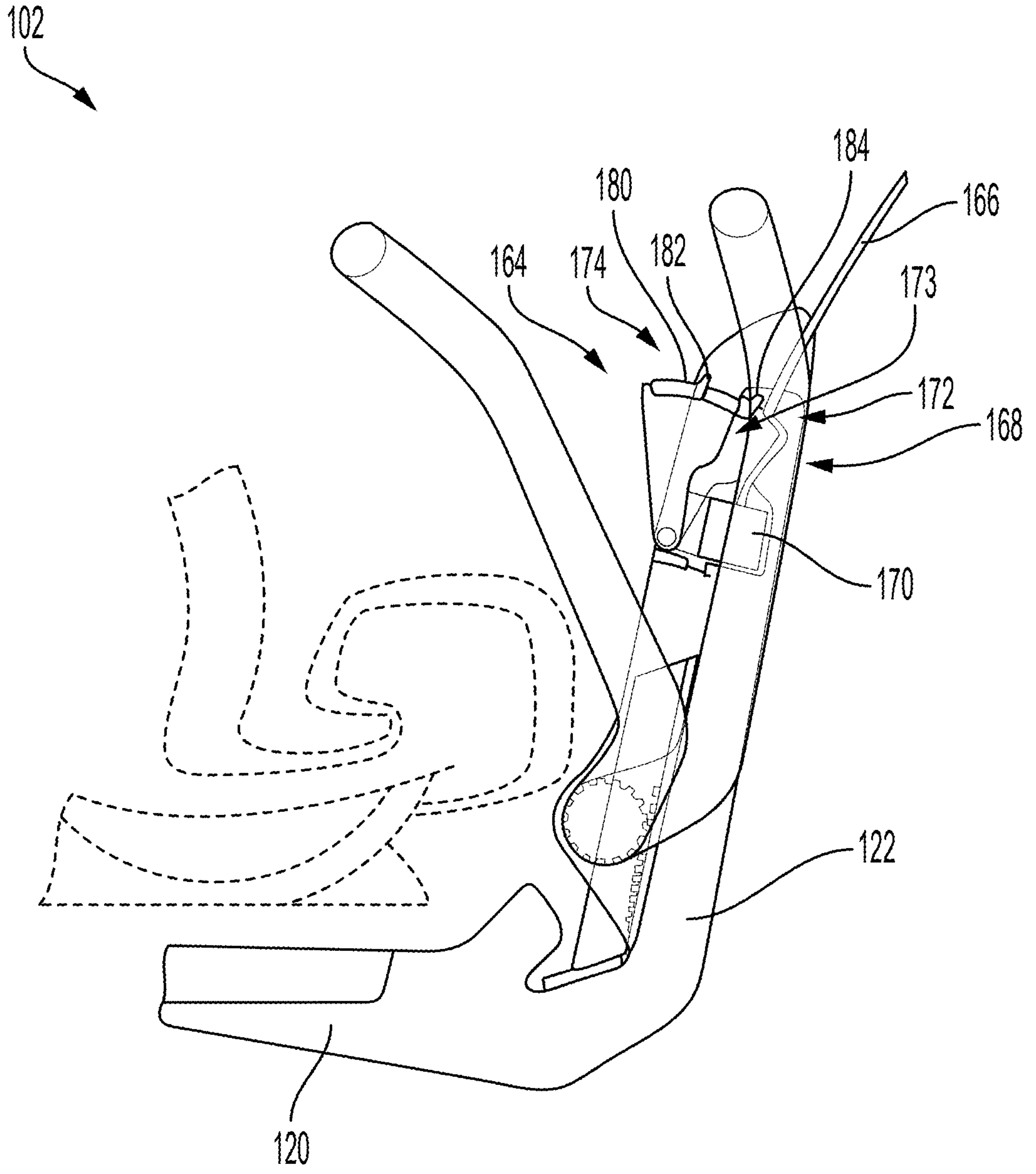
FIG. 13 illustrates a side cross sectional view of a child seat having a tensioning mechanism and a tether system, according to various embodiments.

FIGS. 12 and 13 illustrate a perspective view and a cross sectional view of a child seat having a tensioning mechanism and a tether system, according to various embodiments. As previously introduced, the base 102 may include a base wall 120 and a back wall 122. In an embodiment, the back wall 122 defines tether system 164 having a top tether path 168. The top tether path 168 of the tether system 164 is configured to receive a top tether 166. Generally, the top tether 166 is configured to anchor a portion of the child seat 100 to a portion of the vehicle seat. In an example configuration, the top tether 166 anchors the back wall 122 of the child seat 100 to the back portion of the vehicle seat. In this example, the top tether 166 may reduce forward-pivoting in the event of a crash when the child seat is in the forward facing configuration.

Referring to FIGS. 12 and 13, the tether system 164 is pivotally connected to back wall 122 of the base 102. However, in many embodiments, the tether system 164 may be provided at other locations depending on the type of child seat. The tether system 164 includes an open configuration and a closed configuration. In FIG. 12, the tether system 164 is in the open configuration. In the open configuration, the tether system 164 is deactivated and does not engage the top tether 166. In contrast, the tether system 164 is activated and engages the top tether 166 in the closed configuration. A user may adjust the tether system 164 between each configuration.

In an embodiment, the tether system 164 includes a retractor 170. The top tether 166 extends through the top tether path 168 and engages the retractor 170. In an illustrative embodiment, a user adjusts the tether system 164 from the open configuration to the closed configuration. Referring to FIG. 13, the tether system 164 pivots, thereby rotating into the back wall 122 of the base 102. As the tether system 164 rotates into the back wall 122 of the base 102, a portion 173 of the tether system 164 engages and displaces the top tether 166 into a complementary groove 172 of the back wall 122. Because the retractor 170 anchors the top tether 166 to the back wall 122, the tether system 164 tightens the top tether 166 as top tether 166 is displaced, thereby reducing slack and securing the back wall 122 to the vehicle seat.

Alternatively, a user may adjust the tether system 164 from the closed configuration to the open configuration. As the tether system 164 pivots away from the back wall 122, the portion 173 of the tether system 164 disengages the top tether 166. By releasing the top tether 166 from the complimentary groove 172 of the back wall 122, additional slack is provided to the top tether 166, thereby loosening the back wall 122 from the vehicle seat.

In an embodiment, the tether system 164 may further include a locking assembly 174 having a locked configuration and an unlocked configuration. In the locked configuration, a user is unable to adjust the tether system 164 between the open and closed configurations. Alternatively, when the locking assembly 174 is in the unlocked configuration, a user is able to adjust the tether system 164 between the open and closed configurations. In an embodiment, the locking assembly 174 includes a release 180 adjacent to the tether system 164. The release 180 includes a notch 182 that engages a complementary indent 184 in the back wall 122. When the notch 182 engages the complementary indent 184, the locking assembly 174 is in the lock configuration, preventing the user from adjusting the tether system 164 between the open and closed configurations. Alternatively, a user may disengage the notch 182 from the complementary indent 184 via the release 180, thereby transitioning the locking assembly 174 from the locked to the unlock configuration. Once the locking assembly 174 is in the unlocked configuration, a user is able to adjust the tether system 164 between the open and closed configurations.

As shown in FIG. 12, the base 102 may include the tether system 164 in combination with a tensioning mechanism 104. The base may further include an indication system 176 which indicates the configuration of the tether system 164 and the tensioning mechanism 104. In an embodiment, the indication system 176 includes a tether system indication 178 and a tensioning mechanism indication 181. The tether system indication 178 indicates whether the tether system 164 is in the open or closed configuration. In an example, the tether system indication 178 displays green if the tether system 164 is in the closed position. In contrast, the tether system indication 178 displays red if the tether system 164 is in the open position. The tensioning mechanism indication 181 functions similar to the tether system indication 178. For example, the tensioning mechanism indication 181 indicates whether the tensioning mechanism 104 is in the open or closed configuration. In an example, the tensioning mechanism indication 181 displays green if the tensioning mechanism 104 is in the closed position. In contrast, the tensioning mechanism indication 181 displays red if the tensioning mechanism 104 is in the open position.

The indication system 176 may provide added safety during installation. For example, a user can reference the indication system 176 to determine whether the base 102 is properly secured to the vehicle seat. In one example, the tensioning mechanism 104 may be flush with the back wall 122 and appear to be in the closed configuration. However, the indication system 176 may display red, indicating that the locking assembly of the tensioning mechanism 104 was improperly closed. In response, a user may readjust and close the locking assembly, properly securing the base 102 to the vehicle seat. While FIGS. 12 and 13 illustrate the indication system 176 on the back wall 122, the indication system 176 may be provided at other locations depending on the type of child seat, such as one side or both sides of back wall 122.

In another embodiment, a user may be required to perform the installation of the child seat in a predetermined order. For example, a user may be required to adjust the tether system 164 to the closed configuration, securing the back wall 122 to the vehicle seat, before adjusting the tensioning mechanism 104 to the closed configuration. If the user does not secure the back wall 122 to the vehicle seat by adjusting the tether system 164 to the closed configuration, the base 102 is configured to prevent the user from adjusting the tensioning mechanism 104 to the closed position. In an example, the tether system indication 178 may display red, reminding the user to adjust the tether system 164 before attempting to adjust the tensioning mechanism 104 to the closed position.

Figure 14:
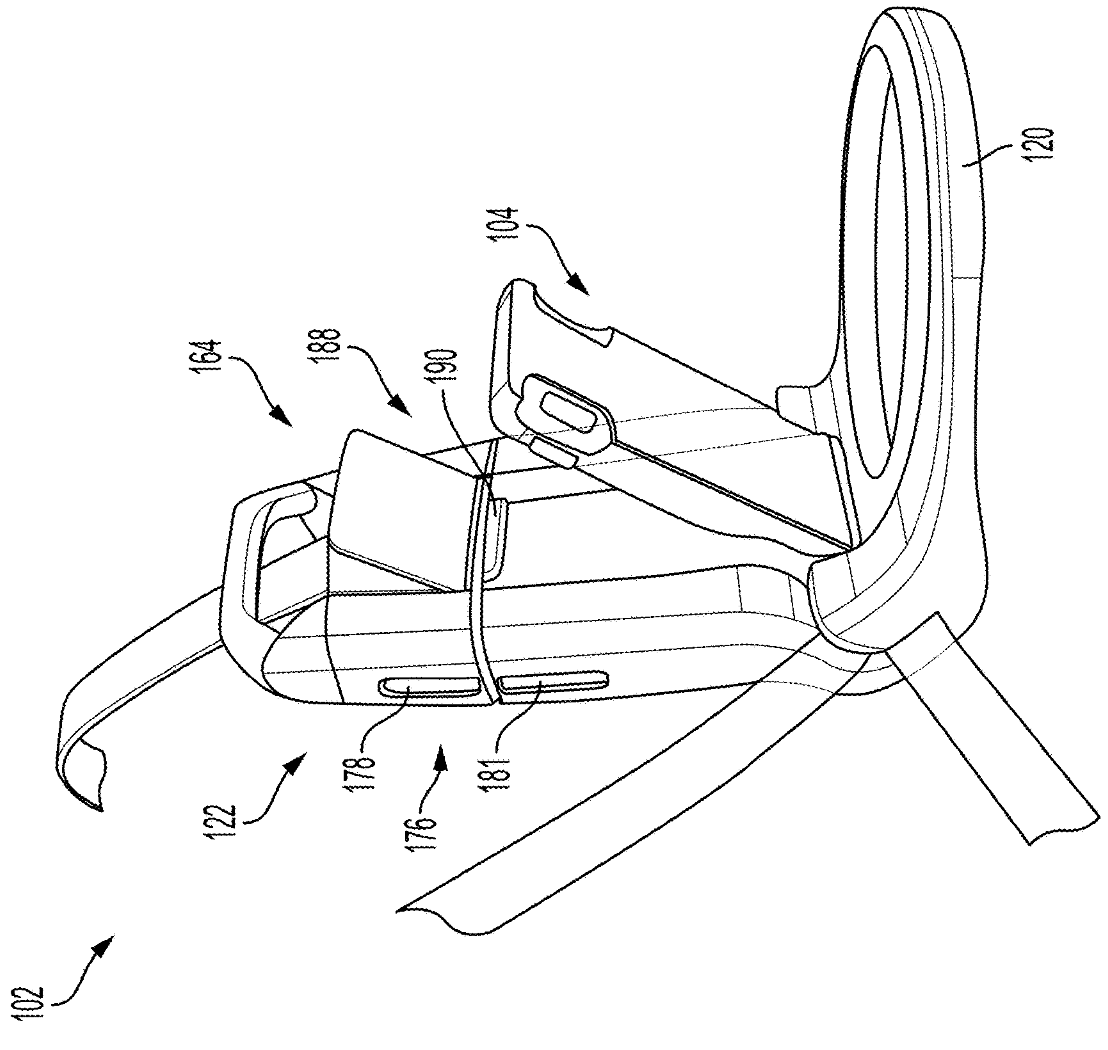
FIG. 14 illustrates a perspective view of a child seat having a tensioning mechanism and a tether block system in open positions, according to various embodiments.

FIG. 14 illustrates a perspective view of a child seat having a tensioning mechanism and a tether block system in open positions, according to various embodiments. For example, when tether system 164 is in the open configuration, it prevents tensioning mechanism 104 from being pushed into the closed position. Namely, in an embodiment, the base 102 includes tether block system 188. As described above, the tether block system 188 requires the user to adjust the tether system 164 to the closed configuration before adjusting the tensioning mechanism 104 to the closed configuration. As shown in FIG. 14, the tether block system 188 includes a tensioning mechanism block 190. When the tether system 164 is in the open position, the tensioning mechanism block 190 extends from the tether system 164, preventing a user from adjusting the tensioning mechanism 104 to the closed configuration. However, as the user adjusts the tether system 164 to the closed configuration, the tensioning mechanism block 190 retracts into the tether system 164. Once the tether system 164 is in the closed configuration, the tensioning mechanism block 190 is retracted into the tether system 164. Then, the user can adjust the tensioning mechanism 104 to the closed configuration.

Figure 15:
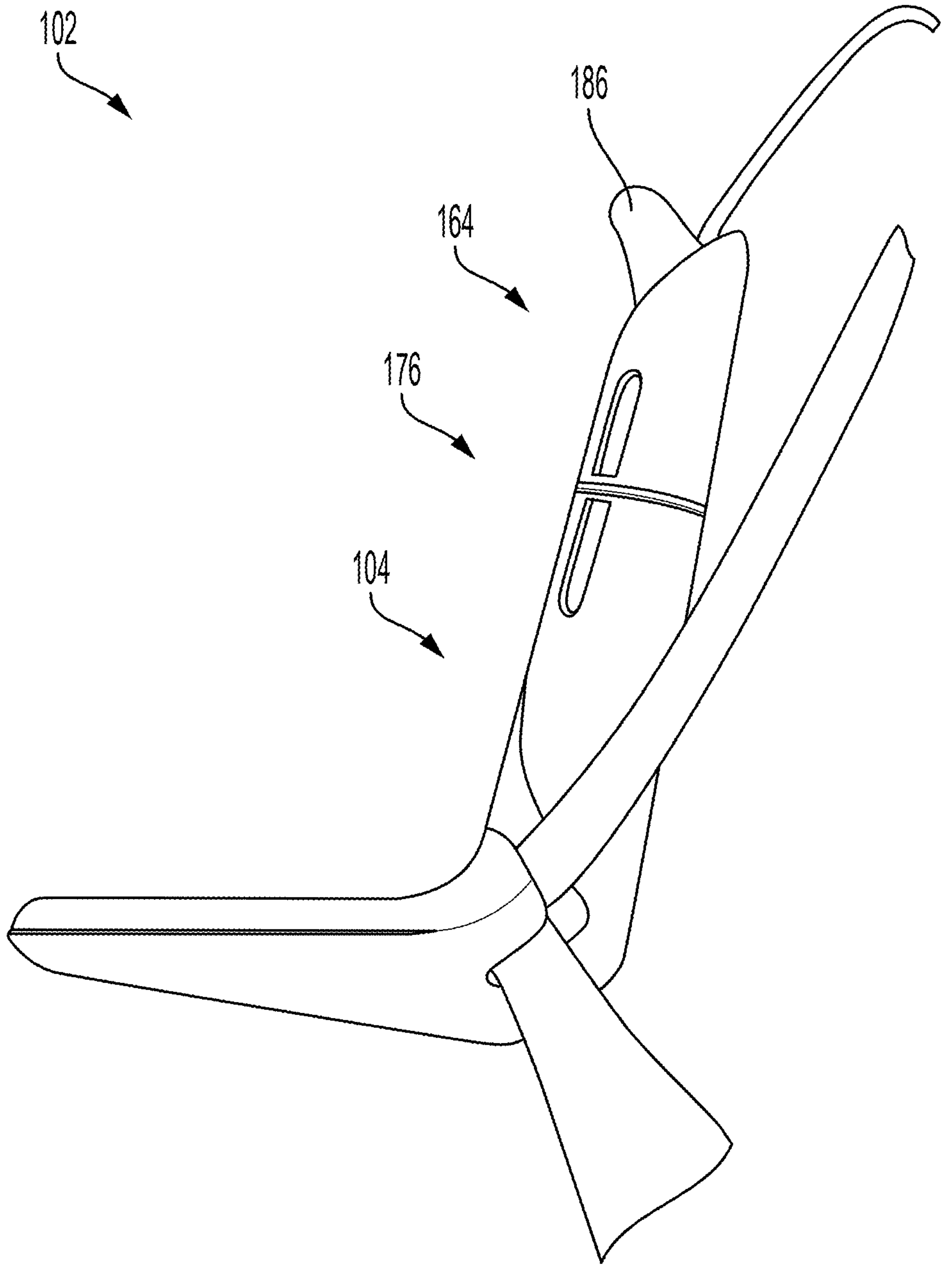
FIG. 15 illustrates a side view of a child seat having a tensioning mechanism and a tether block system in closed positions, according to various embodiments.
Figure 16:
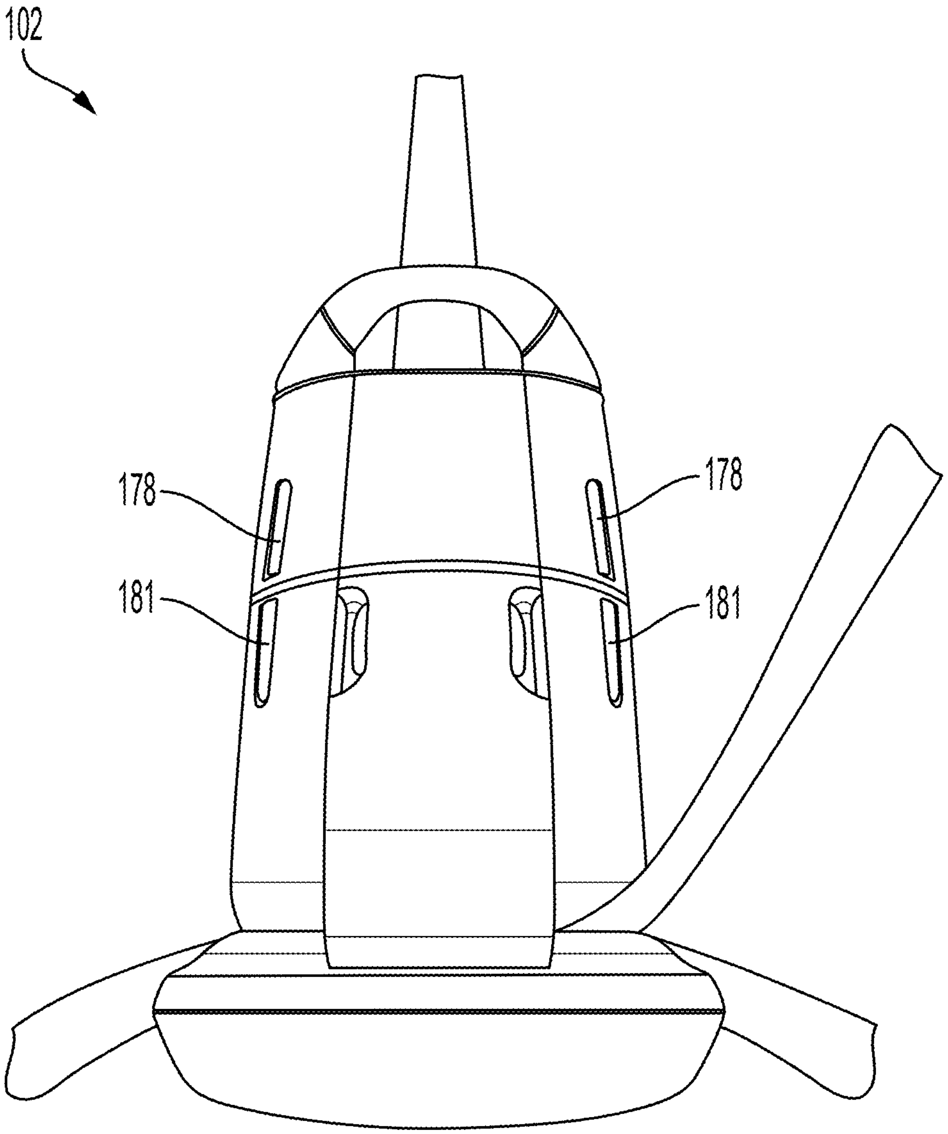
FIG. 16 illustrates a front view of a child seat having a tensioning mechanism and a tether block system in closed positions, according to various embodiments.

FIGS. 15 to 16 illustrates a side view and a front view of a base of a child seat having a tensioning mechanism and a tether block system in closed positions, according to various embodiments. As previously introduced, the base 102 may include the tether system 164, the tensioning mechanism 104, and the indication system 176. Referring to FIGS. 15 and 16, the tether system 164 and the tensioning mechanism 104 are in the closed configuration. Thus, the indication system 176 displays green, indicating that that the tether system 164 and the tensioning mechanism 104 are in the closed configuration and the base 102 is properly secured to the vehicle seat. As illustrated in FIGS. 15 and 16, the indication system 176 is located on the back wall 122, such that the indication system 176 is visible from a side view and a front view. This allows the user to easily determine the configuration of the tether system 164 and the tensioning mechanism 104 from a range of angles, which may be advantageous during the installation process. The base 102 may further include a handle 186. With the handle 186, a user may more easily carry the base 102 to and from the vehicle. Further, during installation, a user may use the handle 186 to adjust the base 102 to properly sit in the vehicle seat.

Figure 17:
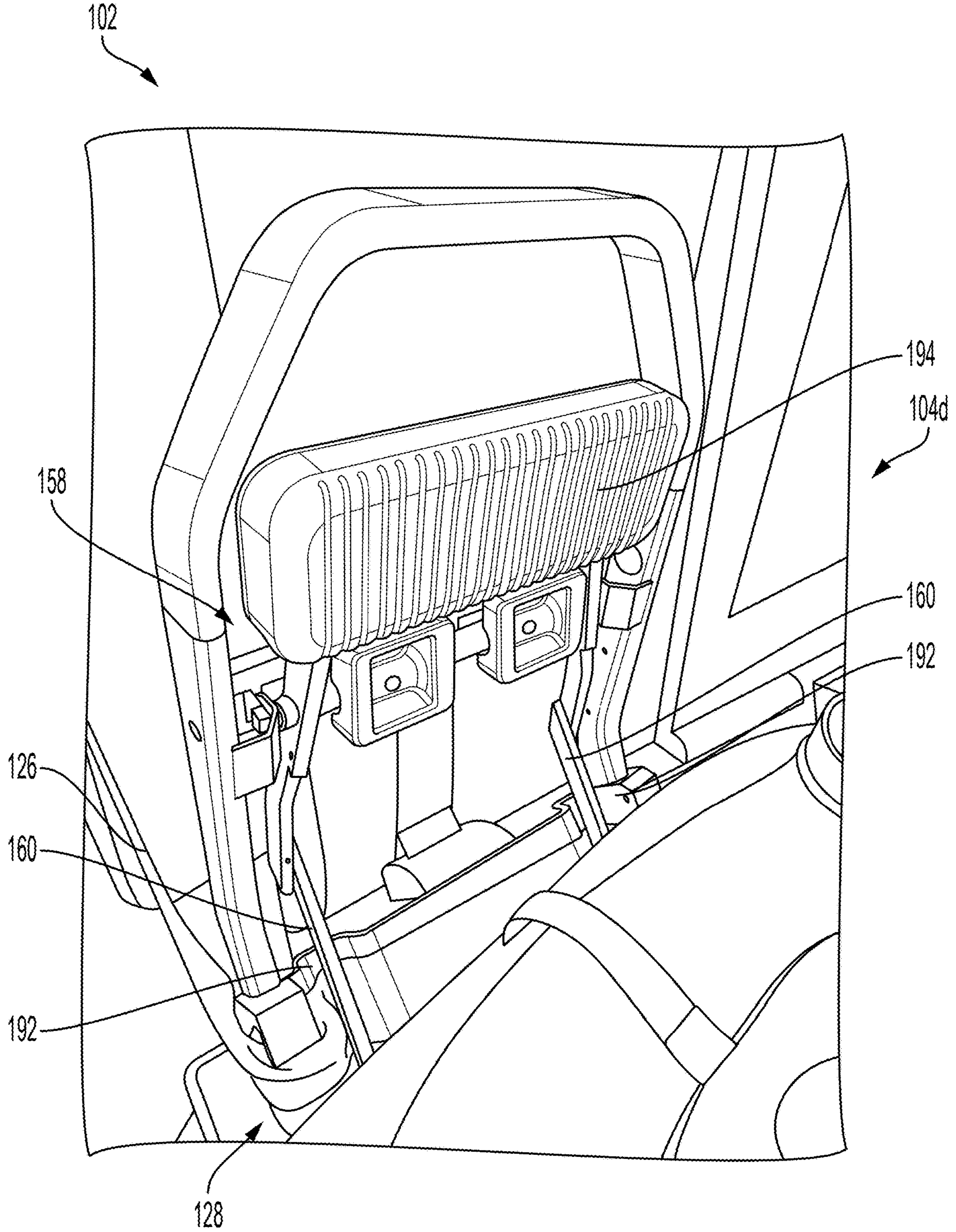
FIG. 17 illustrates a perspective view of a tensioning mechanism in a closed position, according to various embodiments.

FIG. 17 illustrates a perspective view of a tensioning mechanism in a closed configuration, according to various embodiments. In the embodiment illustrated, the base 102 receives a seat belt 126 via a belt path 128. The seat belt 126 extends across a guide region of the of the belt path 128. The guide region may further include receiving structures 192. As shown in FIG. 17, the tensioning mechanism **104*d* displaces the seat belt 126 into the receiving structures 192 in the closed configuration. By displacing the seat belt 126 into the receiving structures 192, the tensioning mechanism 104*d* tightens the seat belt 126, removing slack and securing the base 102** to the vehicle seat.

Figure 18:
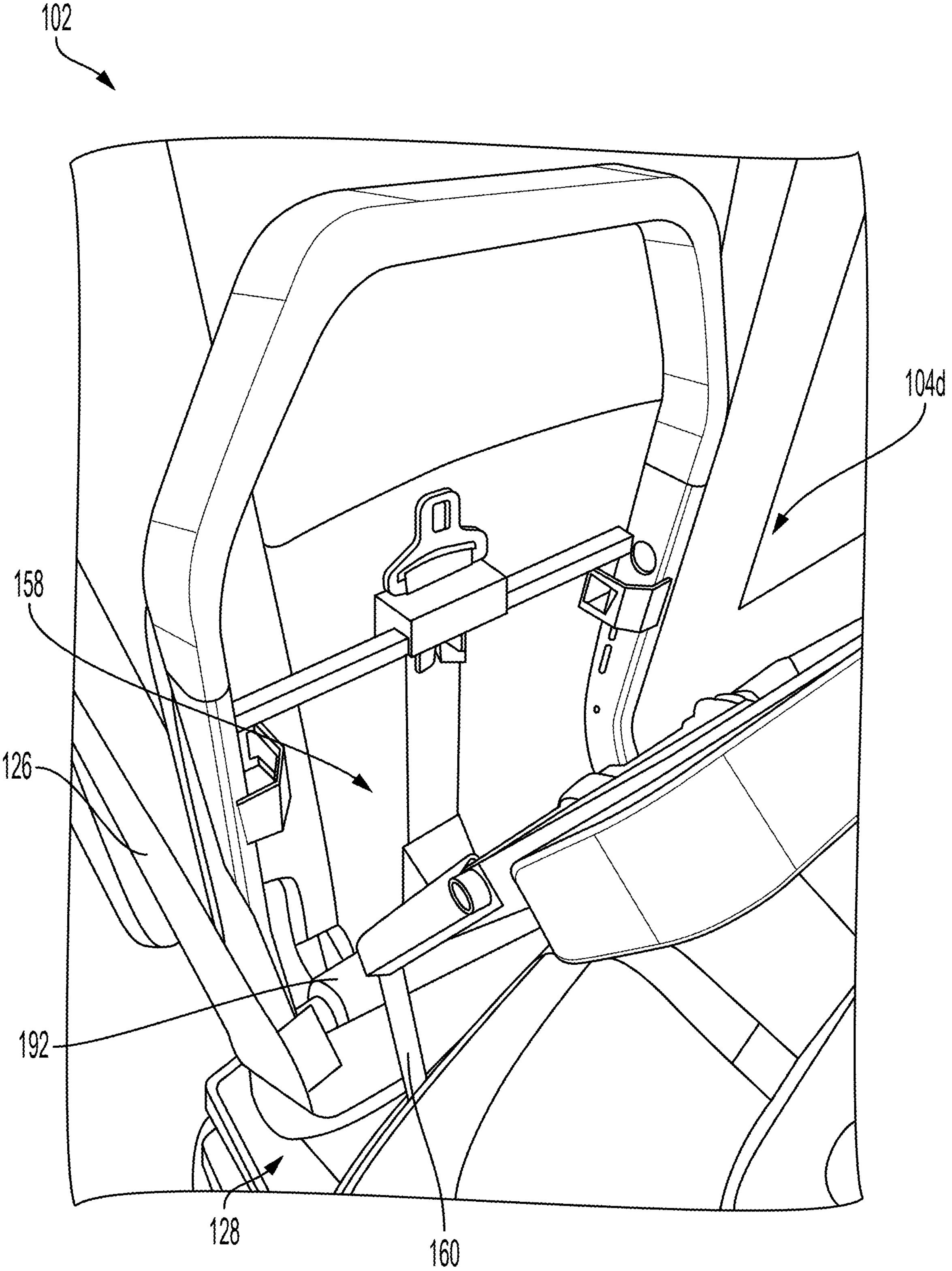
FIG. 18 illustrates a perspective view of a tensioning mechanism in an open position, according to various embodiments.

In an example embodiment, the tensioning mechanism **104*d* is a lever system 158 pivotably connected to the base wall. The lever system 158 includes side arms 160 and a top platform 194. In an illustrative example, the tensioning mechanism 104*d* is in an open position, as shown in FIG. 18. When a user pivotably rotates the lever system 158 to the closed position, the lever system 158 engages the seat belt 126 within the belt path 128 and provides a force onto the seat belt 126. In particular, each side arm 160 of the lever system 158 provides a force on the seat belt 126. By providing such force, each side arm 160 individually displaces the seat belt 126 into each receiving structure 192. Thus, the lever system 158 tightens the seat belt 126, removing slack and securing the base 102** to the vehicle seat.

In examples embodiments, one may vary the design of the receiving structures 192 to achieve a desired displacement of the seat belt 126. Such customization may be desirable because the distance of displacement may affect the amount of force that secures the base 102 to the vehicle seat. In turn, this force may affect the safety of the child seat or the ease of installation of the child seat. In an illustration example, the tensioning mechanism **104*d* displaces the seat belt 126 a distance, x, into each receiving structure 192. As x increases, the tensioning mechanism 104*d* displaces the seat belt 126 a greater distance in the closed configuration. Notably, when the tensioning mechanism 104 displaces the seat belt 126 a greater distance, additional slack may be removed from the seat belt 126, increasing the amount of force that secures the base 102 to the vehicle seat. In contrast, as x decreases, the tensioning mechanism 104*d* displaces the seat belt 126 a smaller distance in the closed configuration. When the tensioning mechanism 104 displaces the seat belt 126 a smaller distance, less slack is removed from the seat belt 126, decreasing the amount of force that secures the base 102 to the vehicle seat. Thus, to increase safety and provide a greater amount of force to secure the base 102 to the vehicle seat, the receiving structures 192 may be configured to provide a greater displacement of the seat belt 126**.

As introduced above, the distance of displacement of the seat belt may also affect the ease of installation of the child seat in the vehicle seat. For example, a greater displacement distance will require the tensioning mechanism 104*d* to provide a greater force to remove additional slack from the seat belt 126, increasing the amount of force that secures the base 102 to the vehicle seat. However, based on the amount of force, it may be difficult for a user to install the base 102 in a vehicle seat and adjust the tensioning mechanism from the open configuration to the closed configuration. To address these potential issues, one may vary the design of the tensioning mechanism 104*d* for additional leverage, which can provide a greater amount of force on the seat belt 126 with an equal amount of force on the tensioning mechanism 104 by the user.

In one example introduced above, one may vary the features of the car seat to provide a greater degree of rotation of the tensioning mechanism 104. Referring to FIG. 11, the shell 108 of the child seat 100 includes slots 163 that receive the side arms 160 of the lever system 158 when tensioning mechanism 104*c* is in the open configuration. By receiving the side arms 160, the lever system 158 may rotate further away from the receiving structures 192 (as shown in FIG. 17) in the open configuration. This allows for an overall increase in rotation from the open configuration to the closed configuration. An increase in the total rotation of lever system 158 results in a greater amount of leverage onto the seat belt 126. Thus, a user may provide a greater amount of force on the seat belt 126 to displace the seat belt 126 a greater distance while exerting the same amount of force on the tensioning mechanism 104*d*. Such design may ease the installation process.

In another example, one may vary the length of the side arms 160 to provide additional leverage. As discussed above, the tensioning mechanism 104*d*, and particularly the side arms 160, is of sufficient length (from its pivot point up towards top bar 162) such that the pivoting of tensioning mechanism 104*d* to the closed configuration provides substantial mechanical advantage. As the user manually adjusts tensioning mechanism 104*c* to the closed configuration, substantial mechanical force is generated at the pivot point. To increase the mechanical force generated, the length of the side arms 160 may be increased. The above example provide various parameters that may be varied to achieve a desired amount of force, f, for securing the base to the vehicle seat. Non-limiting example parameters include the structure of the receiving structures 192 or the number of the receiving structures 192, which may correspond to the overall displacement distance of the seat belt 126. Additional parameters may include the length of the side arms 160, the degree of rotation of the tensioning mechanism 104, and the structure of the child seat.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention claimed is:

1. A child seat configured to be secured to a car seat, the child seat comprising:

a base comprising a belt path configured to receive a belt; and a tensioning mechanism pivotably attached to the base, wherein the tensioning mechanism is adjustable between a first configuration and a second configuration, wherein, in the first configuration, the tensioning mechanism is disposed adjacent to a portion of the belt, and wherein, in the second configuration, the tensioning mechanism applies tension to the portion of the belt, wherein the car seat comprises a car seat bottom and a car seat back, wherein the base includes a first portion contacting the car seat bottom and a second portion contacting the car seat back, wherein the tensioning mechanism is pivotably attached to the second portion of the base, wherein the tensioning mechanism includes a pivot assembly having an upper linkage and a lower linkage, wherein each of the upper linkage and lower linkage are affixed to the second portion of the base, and wherein the tensioning mechanism is configured to pivot and translate toward both the first portion of the base and the second portion of the base as the tensioning mechanism transitions from the first configuration to the second configuration.

2. The child seat of claim 1, wherein the tensioning mechanism includes a securement indicator.

3. The child seat of claim 1, wherein, when disposed in the second configuration, the tensioning mechanism is disposed in a receptacle of the second portion of the base.

4. The child seat of claim 1, wherein the tensioning mechanism is pivotably attached to the first portion of the base.

5. The child seat of claim 1, wherein the tensioning mechanism includes a connector link and further includes a ram, affixed to the connector link.

6. The child seat of claim 5, wherein the tensioning mechanism is configured to pivot toward the second portion of the base, and wherein, responsive to the pivoting, the ram translates in a downward direction toward the first portion of the base.

7. The child seat of claim 1, wherein the second portion of the base further includes a tether system.

8. The child seat of claim 7, wherein the tether system includes a separate tensioning mechanism, pivotably attached to the second portion of the base.

9. The child seat of claim 7, wherein the tensioning mechanism includes a securement indicator.

* * * * *